United States Patent
Bekiarov

(10) Patent No.: US 8,823,208 B2
(45) Date of Patent: Sep. 2, 2014

(54) SELF-ENERGIZING VOLTAGE REGULATOR WITH IMPROVED TRANSIENT RECOVERY

(75) Inventor: Stoyan Borissov Bekiarov, Chicago, IL (US)

(73) Assignee: C. E. Niehoff & Co., Evanston, IL (US)

( * ) Notice: Subject to any disclaimer, the term of this patent is extended or adjusted under 35 U.S.C. 154(b) by 293 days.

(21) Appl. No.: 13/297,440

(22) Filed: Nov. 16, 2011

(65) Prior Publication Data

US 2013/0119948 A1  May 16, 2013

(51) Int. Cl.
| | | |
|---|---|---|
| B60L 1/00 | (2006.01) | |
| B60L 3/00 | (2006.01) | |
| H02G 3/00 | (2006.01) | |
| H02P 9/10 | (2006.01) | |
| H02P 9/48 | (2006.01) | |
| H02P 9/00 | (2006.01) | |

(52) U.S. Cl.
CPC ............ *H02P 9/48* (2013.01); *H02P 2009/002* (2013.01); *H02P 9/107* (2013.01)
USPC ........................................................ 307/10.1

(58) Field of Classification Search
CPC ..... H02P 9/107; H02P 2009/002; H02P 7/29; H02P 9/48; H02P 9/00; H02P 9/305; H02H 7/06; H02K 11/046; H02K 19/365
USPC ................................................. 307/10.1, 140
See application file for complete search history.

(56) References Cited

U.S. PATENT DOCUMENTS

| | | | |
|---|---|---|---|
| 3,450,977 A | 6/1969 | Krauss | |
| 3,649,903 A | 3/1972 | Fiedler | |
| 4,488,053 A | 12/1984 | Cronin | |
| 4,510,433 A | 4/1985 | Gamze et al. | |
| 4,692,684 A | 9/1987 | Schaeffer | |
| 5,206,580 A | 4/1993 | Okamoto et al. | |
| 5,373,196 A | 12/1994 | Faley | |
| 5,656,922 A * | 8/1997 | LaVelle et al. | 322/46 |
| 5,793,167 A | 8/1998 | Liang et al. | |
| 5,850,138 A | 12/1998 | Adams et al. | |
| 6,353,307 B1 | 3/2002 | Koelle et al. | |
| 6,909,199 B2 | 6/2005 | Gupta et al. | |
| 6,924,629 B1 | 8/2005 | Mueller et al. | |
| 7,068,014 B2 | 6/2006 | Gabrys | |
| 7,106,030 B2 * | 9/2006 | Isurin et al. | 322/59 |
| 7,332,827 B2 | 2/2008 | Nielsen | |
| 7,759,909 B2 * | 7/2010 | Graovac et al. | 322/59 |
| 2004/0090211 A1 | 5/2004 | Gupta et al. | |
| 2010/0225112 A1 | 9/2010 | Hayakawa | |

* cited by examiner

*Primary Examiner* — Carlos Amaya
(74) *Attorney, Agent, or Firm* — Ahmadshahi & Associates

(57) ABSTRACT

A vehicle electrical system comprises a generator, voltage regulator, switch module, and control device. The generator includes a field coil and one or more stator windings coupled together via the switch module. The generator provides electrical current to one or more electrical loads. The voltage regulator maintains the generator output voltage at a constant voltage by varying the field current. The switch module may include low-power transistors. The control device monitors the field current, output voltage and stator current and applies control signals to the switch module to improve transient recovery due to sudden variations in the electrical load and increase system efficiency during normal operation.

18 Claims, 4 Drawing Sheets

SELF-ENERGIZING VOLTAGE REGULATOR WITH IMPROVED TRANSIENT RECOVERY

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

This invention is related to a system and method for controlling electrical power in a vehicle electrical system. In particular, the present invention relates to a control device which utilizes a switch module, comprising low-power transistors, to control the field and stator current during normal and transient operating modes. The control device, including the system and method, achieves this by monitoring the field current of the generator field coil and generator output voltage and controlling the electrical current through the generator stator windings, via the switch module, according to the field current and output voltage. The control device may be further configured to increase system efficiency by reducing electrical power loss in the associated transistors during generator steady-state operation.

BACKGROUND

The present invention relates to a vehicle electrical system comprising a generator operative to deliver electrical power to an electrical load, a voltage regulator which maintains the generator output voltage at a regulation voltage, and a control device which utilizes a switch module in place of the conventional diode trio, further complementing the voltage regulator's operation, i.e., field switching, and improving transient recovery due to sudden variations in the electrical load. Utilizing the switch module instead of the conventional diode trio, the control device is capable of swiftly suppressing voltage transients. In an over voltage condition, the control device utilizes the switch module to clip the generator output voltage to within an acceptable level by switching on the switch module, thereby, dissipating stator current within the stator windings. In an under voltage condition, the control device utilizes the switch module to temporarily boost the generator output power by switching on/off the switch module at a frequency which is higher than the generator RPM. The control device may also utilize the switch module during normal operation to increase system efficiency by switching on/off the switch module synchronously, thereby, reducing electrical power loss within the switch module. The control device and its method of operation make it possible to use low-power transistors in the switch module. There are several advantages to this architecture including but not limited to implementation of the control device without the need for changing the generator components, reduction in the overall dimension of the generator or voltage regulator, increased system efficiency, and realization of improved transient recovery utilizing inexpensive components.

A typical vehicle electrical system comprises a generator and a voltage regulator. The generator operates to provide electrical power to the electrical load at a regulation voltage according to the voltage regulator parameters. The voltage regulator operates to maintain the system voltage at the regulation voltage by switching on/off the generator field coil in accordance with the electrical load requirements and generator RPM. In a conventional system, utilizing a generator with three stator windings, the field coil, as is known to artisans of ordinary skill, is coupled to the generator stator windings via three diodes, commonly referred to as the diode trio. Conventional generators use the diode trio for two main reasons. The first reason is to make use of the residual magnetism of the generator in order to "wake up" the regulator when the generator starts rotating. The concept is known in the industry as "self-energizing regulator" and refers to the fact that there is no need for a dedicated energize signal, which otherwise usually comes through an additional wire and is activated by the vehicle ignition switch. The second reason for using the diode trio is to reduce current flow through the positive rectifier diodes in the main rectifier assembly, since the field current goes directly from stator windings to the field coil through the diode trio terminal.

This invention improves the conventional system by substituting the diode trio with a switch module comprising bidirectional solid state switches (MOSFTs or IGBTs with anti-parallel body diodes) and making use of the bidirectional capability of the switches through a control algorithm, which adds an important advantage, namely, faster and better transient response, resulting in very tight voltage regulation even under extreme load transients. As an additional benefit, the MOSFETs/IGBTs can be used to improve the efficiency of field circuit through synchronous rectification.

For heavy duty generators operating at high speed and load, electrical load variations can lead to unacceptably large voltage transient levels and duration. For instance, over voltage condition may be large and long enough to be interpreted by the voltage regulator, equipped with an over voltage protection circuit, as a genuine over voltage condition, causing it to deactivate itself. Alternatively, the over voltage condition may be tolerated by the voltage regulator but nevertheless be long enough to the detriment of certain electrical components within the electrical system. Under voltage conditions, due to sudden application of electrical loads, can also lead to system malfunction. For instance, certain electrical components in the vehicle electrical system may reset, reinitialize, or timeout due to low system voltage.

As the number of electrical components in vehicles increases, electrical power consumption increases accordingly. As a result, the vehicle electrical system must use high power generators that can produce sufficient electrical power to meet the demand. High power generators have correspondingly higher energy transients than lower power generators. Transient voltages associated with electrical load variations in such electrical systems can be detrimental to electrical components in the electrical system.

A typical vehicle electrical system includes electrical components that comprise semiconductor devices, such as power field effect transistors (FETs), smart power integrated circuits (ICs), microcontroller units (MCUs), digital signal processors (DSPs), memory, analog ICs, and numerous discrete devices. Sudden load variations in the electrical system due to sudden connection/disconnection of the electrical loads can destroy or otherwise cause malfunction in such devices. These transients are the most potentially destructive transients in the vehicle electrical system due to the combination of high voltage and high energy.

Under voltage condition occurs when one or more electrical loads are suddenly switched on and the generator is unable to produce electrical power fast enough to supply the electrical loads. Over voltage condition occurs when one or more electrical loads are suddenly disconnected and the generator is unable to dissipate the electrical energy in the generator field and stator coils fast enough to keep the output voltage within an acceptable voltage range. Although vehicle electrical systems ordinarily include one or more electrical energy sources such as batteries which, to a certain degree, improve the under voltage and over voltage conditions, extreme voltage transients still affect the power quality in such electrical systems. Furthermore, there are some applications where the vehicle electrical system does not include batteries which exacerbate the transient voltage variations due to sudden connection/disconnection of the electrical loads.

Batteries in a vehicle electrical system operate to provide electrical power to the electrical loads when the vehicle engine is turned off and/or when the vehicle engine is turned on but the generator is incapable of generating sufficient electrical power at the operating speed (RPM) to meet the demand, such as is the case when a high electrical power consuming device like an air conditioning unit is switched on. Batteries also act as reservoirs where excess electrical power can be stored, such as is the case when the air conditioning unit is suddenly switched off. Such sudden demand and supply of electrical power in the electrical system can occur even when the vehicle engine is operating at the rated RPM.

For instance, a vehicle electrical system including a generator that is rated to generate 500 Amps at 5000 RPM will, momentarily, experience a dip in the system voltage when a large electrical load is suddenly switched on due to the slow response time of the generator which may last in the order of hundreds of milliseconds. Similarly, a sudden disconnection of the electrical load at the above mentioned RPM, will give rise to a spike in the system voltage that may last for the same time period. These under voltage and over voltage conditions occur even in the presence of one or more batteries in the electrical system.

Not only are these transient conditions detrimental to the electrical components in the vehicle electrical system, repetitive battery under charge and over charge is detrimental to the batteries. Furthermore, the effects of the under voltage and over voltage conditions on the electrical components are intensified in batteryless applications. Consequently, there is a need for a control device that operates to improve the power quality of the electrical system by suppressing voltage transients due to sudden variations in the electrical loads.

Although various systems have been proposed which touch upon some aspects of the above problems, they do not provide solutions to the existing limitations in providing high quality electrical power within a vehicle electrical system. For example, in Muller et al., U.S. Pat. No. 6,924,629, a device and a method for the control of a generator are disclosed in which the rectifier bridge connected to the generator can be temporarily short-circuited, as a result of which power is temporarily stored in the stator inductors, which results in higher phase voltages. Suitable selection of the control frequency for a transistor, which makes the short-circuiting of the diode bridge possible, allows an output voltage of the generator to be set to the desired voltage level which is clearly higher than the conventional vehicle electrical system voltage. The diode bridge itself can be replaced by controllable switching elements (transistors) and a voltage adjustment is implemented using suitable controls. Muller is limited in that it uses the generator's main rectifiers to control the stator current which must necessarily be made up of high-power electrical components.

Koelle et al., U.S. Pat. No. 6,353,307, discloses a controlled rectifier bridge for a generator having a plurality of phase windings and one exciter winding is constructed as a self-controlled rectifier bridge with MOS field effect transistor. To allow the use of such a rectifier bridge upon a fast load reduction with an attendant load-dump voltage, a voltage protection circuit is employed that feeds the energy, stored in the exciter winding upon a fast shutoff, back into the battery, thus deexciting the exciter winding. Upon a fast load reduction, the generator windings are short-circuited by suitable triggering of the low- or high-side transistors. Similar to Muller, the rectifiers require high-power electrical components and furthermore, it does nothing to improve undervoltage conditions.

In today's modern vehicles, the vehicle electrical system comprises a large number of electrical components that consume large amounts of electrical power. Consequently, vehicle electrical systems use high power generators to meet the high electrical power requirement. Additionally, the vehicle electrical system incorporates electrical devices that are often sensitive to voltage fluctuations in the electrical system. As a result, the vehicle electrical system must provide high electrical power while minimizing the transient effects due to connection and/or disconnection of the electrical components. This requires the vehicle electrical system to be capable of rapidly suppressing any under voltage and over voltage conditions that may occur as a result of such connection/disconnection, before the electrical components malfunction or become inoperative. As a simple, yet efficient, alternative to existing technologies, the present invention offers a vehicle electrical system capable of providing high electrical power of high quality to multiple electrical components within the vehicle electrical system.

In particular, the control device of the present invention utilizes a switch module instead of the traditional diode trio which couples the generator stator windings to the field coil. The control device implements a control algorithm which monitors the field current, stator current, and output voltage and switches the switch module to controllably short the stator windings so as to suppress voltage transients. By monitoring the field current and output voltage and timely switching the switch module, the control device may utilize low-power transistors to achieve the same result where traditionally use of high-power components was required. The present architecture also lends itself to be used during normal operation by further monitoring the stator current and synchronously switching the switch module to improve system efficiency.

SUMMARY

The present invention discloses a control device, including a system and method, which can be utilized in a vehicle electrical system to provide improved electrical power delivery throughout the vehicle. The vehicle electrical system comprises a generator, a voltage regulator and the control device. In an alternative configuration, the voltage regulator and the control device are a single unit. The generator comprises a field coil and one or more stator windings which are coupled via a switch module. The generator operates to deliver electrical power to an electrical load. The voltage regulator operates to regulate the generator output voltage by varying the field current, and the control device is configured to monitor the field current and generator output voltage and apply one or more control signals to the switch module to improve transient recovery.

In one aspect, a vehicle electrical system is disclosed comprising a generator operative to deliver electrical power to an electrical load at a regulated voltage. The generator comprises a field coil coupled with one or more stator windings via a switch module. The system further includes a voltage regulator that maintains the generator output voltage at a regulation voltage by varying the field current through the field coil. The system further comprises a control device configured to monitor the field current and output voltage and apply a first control signal to the switch module when the field current is turned off and the output voltage is above a first threshold value or a second control signal to the switch module when the field current is turned on and the output voltage is below a second threshold value.

In another aspect, a vehicle electrical system is disclosed comprising a generator operative to deliver electrical power to an electrical load at a regulated voltage. The generator comprises a field coil coupled with one or more stator windings via a switch module. The system further includes a voltage regulator that maintains the generator output voltage at a regulation voltage by varying the field current through the field coil. The system further comprises a control device configured to monitor the field current and output voltage and apply a first control signal to the switch module when the field current is turned off and the output voltage is above a first threshold value or a second control signal to the switch module when the field current is turned on and the output voltage is below a second threshold value. Preferably, the generator comprises three stator windings, the switch module comprises three transistors each comprising one of a MOSFET, IGBT, and bipolar junction transistor, and wherein the first control signal switches on the three transistors simultaneously.

In another aspect, a vehicle electrical system is disclosed comprising a generator operative to deliver electrical power to an electrical load at a regulated voltage. The generator comprises a field coil coupled with one or more stator windings via a switch module. The system further includes a voltage regulator that maintains the generator output voltage at a regulation voltage by varying the field current through the field coil. The system further comprises a control device configured to monitor the field current and output voltage and apply a first control signal to the switch module when the field current is turned off and the output voltage is above a first threshold value or a second control signal to the switch module when the field current is turned on and the output voltage is below a second threshold value. Preferably, the generator comprises three stator windings, the switch module comprises three transistors each comprising one of a MOSFET, IGBT, and bipolar junction transistor, and wherein the second control signal switches on/off, at a predetermined frequency, the three transistors simultaneously.

In another aspect, a vehicle electrical system is disclosed comprising a generator operative to deliver electrical power to an electrical load at a regulated voltage. The generator comprises a field coil coupled with one or more stator windings via a switch module. The system further includes a voltage regulator that maintains the generator output voltage at a regulation voltage by varying the field current through the field coil. The system further comprises a control device configured to monitor the field current and output voltage and apply a first control signal to the switch module when the field current is turned off and the output voltage is above a first threshold value or a second control signal to the switch module when the field current is turned on and the output voltage is below a second threshold value. Preferably, the generator comprises three stator windings, the switch module comprises three transistors each comprising one of a MOSFET, IGBT, and bipolar junction transistor, and wherein the control device is further configured to monitor stator current through the three stator windings and, when the output voltage is within a predetermined voltage range of the regulation voltage, apply a third control signal to the switch module to switch on/off the three transistors synchronously.

In another aspect, a method for controlling a vehicle electrical system is disclosed. The electrical system comprises a generator and a voltage regulator. The generator operates to deliver electrical power to an electrical load at a regulated voltage. The generator comprises a field coil coupled with one or more stator windings via a switch module. The voltage regulator operates to maintain the generator output voltage at a regulation voltage by varying the field current through the field coil. The method comprises monitoring the field current and the output voltage and applying a first control signal to the switch module when the field current is turned off and the output voltage is above a first threshold value or a second control signal to the switch module when the field current is turned on and the output voltage is below a second threshold value.

In another aspect, a method for controlling a vehicle electrical system is disclosed. The electrical system comprises a generator and a voltage regulator. The generator operates to deliver electrical power to an electrical load at a regulated voltage. The generator comprises a field coil coupled with one or more stator windings via a switch module. The voltage regulator operates to maintain the generator output voltage at a regulation voltage by varying the field current through the field coil. The method comprises monitoring the field current and the output voltage and applying a first control signal to the switch module when the field current is turned off and the output voltage is above a first threshold value or a second control signal to the switch module when the field current is turned on and the output voltage is below a second threshold value. Preferably, the generator comprises three stator windings, the switch module comprises three transistors each comprising one of a MOSFET, IGBT, and bipolar junction transistor, and the step of applying the first control signal comprises switching on the three transistors simultaneously.

In another aspect, a method for controlling a vehicle electrical system is disclosed. The electrical system comprises a generator and a voltage regulator. The generator operates to deliver electrical power to an electrical load at a regulated voltage. The generator comprises a field coil coupled with one or more stator windings via a switch module. The voltage regulator operates to maintain the generator output voltage at a regulation voltage by varying the field current through the field coil. The method comprises monitoring the field current and the output voltage and applying a first control signal to the switch module when the field current is turned off and the output voltage is above a first threshold value or a second control signal to the switch module when the field current is turned on and the output voltage is below a second threshold value. Preferably, the generator comprises three stator windings, the switch module comprises three transistors each comprising one of a MOSFET, IGBT, and bipolar junction transistor, and the step of applying the second control signal comprises switching on/off, at a predetermined frequency, the three transistors simultaneously.

In another aspect, a method for controlling a vehicle electrical system is disclosed. The electrical system comprises a generator and a voltage regulator. The generator operates to deliver electrical power to an electrical load at a regulated voltage. The generator comprises a field coil coupled with one or more stator windings via a switch module. The voltage regulator operates to maintain the generator output voltage at a regulation voltage by varying the field current through the field coil. The method comprises monitoring the field current and the output voltage and applying a first control signal to the switch module when the field current is turned off and the output voltage is above a first threshold value or a second control signal to the switch module when the field current is turned on and the output voltage is below a second threshold value. Preferably, the generator comprises three stator windings, the switch module comprises three transistors each comprising one of a MOSFET, IGBT, and bipolar junction transistor, and wherein the method further comprises monitoring stator current through the three stator windings and when the output voltage is within a predetermined voltage range of the regulation voltage, the step of applying the first or second control signal comprises applying a third control signal to the switch module to switch on/off the three transistors synchronously.

In another aspect, a control device is disclosed that is coupled with a generator which operates to deliver electrical power to an electrical load. The generator comprises a field coil and one or more stator windings. The control device comprises a switch module which couples the one or more stator windings with the field coil. The control device further comprises a controller, coupled with the generator and switch module wherein the controller is configured to measure field current through the field coil, via a first sense line, measure an output voltage of the generator, via a second sense line, and apply a first control signal, via a control line, to the switch module when the field current is turned off and the output voltage is above a first threshold value or a second control signal, via the control line, to the switch module when the field current is turned on and the output voltage is below a second threshold value.

In another aspect, a control device is disclosed that is coupled with a generator which operates to deliver electrical power to an electrical load. The generator comprises a field coil and one or more stator windings. The control device comprises a switch module which couples the one or more stator windings with the field coil. The control device further comprises a controller, coupled with the generator and switch module wherein the controller is configured to measure field current through the field coil, via a first sense line, measure an output voltage of the generator, via a second sense line, and apply a first control signal, via a control line, to the switch module when the field current is turned off and the output voltage is above a first threshold value or a second control signal, via the control line, to the switch module when the field current is turned on and the output voltage is below a second threshold value. Preferably, the generator comprises three stator windings, the switch module comprises three transistors each comprising one of a MOSFET, IGBT, and bipolar junction transistor, and wherein the first control signal switches on the three transistors simultaneously.

In another aspect, a control device is disclosed that is coupled with a generator which operates to deliver electrical power to an electrical load. The generator comprises a field coil and one or more stator windings. The control device comprises a switch module which couples the one or more stator windings with the field coil. The control device further comprises a controller, coupled with the generator and switch module wherein the controller is configured to measure field current through the field coil, via a first sense line, measure an output voltage of the generator, via a second sense line, and apply a first control signal, via a control line, to the switch module when the field current is turned off and the output voltage is above a first threshold value or a second control signal, via the control line, to the switch module when the field current is turned on and the output voltage is below a second threshold value. Preferably, the generator comprises three stator windings, the switch module comprises three transistors each comprising one of a MOSFET, IGBT, and bipolar junction transistor, and wherein the second control signal switches on/off, at a predetermined frequency, the three transistors simultaneously.

In another aspect, a control device is disclosed that is coupled with a generator which operates to deliver electrical power to an electrical load. The generator comprises a field coil and one or more stator windings. The control device comprises a switch module which couples the one or more stator windings with the field coil. The control device further comprises a controller, coupled with the generator and switch module wherein the controller is configured to measure field current through the field coil, via a first sense line, measure an output voltage of the generator, via a second sense line, and apply a first control signal, via a control line, to the switch module when the field current is turned off and the output voltage is above a first threshold value or a second control signal, via the control line, to the switch module when the field current is turned on and the output voltage is below a second threshold value. Preferably, the generator comprises three stator windings, the switch module comprises three transistors each comprising one of a MOSFET, IGBT, and bipolar junction transistor, and wherein the control device is further configured to measure stator current through the three stator windings, via one or more stator winding sense lines, and, when the output voltage is within a predetermined voltage range of a regulation voltage, apply a third control signal, via the control line, to the switch module to switch on/off the three transistors synchronously.

In another aspect, a control device is disclosed that is coupled with a generator which operates to deliver electrical power to an electrical load. The generator comprises a field coil and one or more stator windings. The control device comprises a switch module which couples the one or more stator windings with the field coil. The control device further comprises a controller, coupled with the generator and switch module wherein the controller is configured to measure field current through the field coil, via a first sense line, measure an output voltage of the generator, via a second sense line, and apply a first control signal, via a control line, to the switch module when the field current is turned off and the output voltage is above a first threshold value or a second control signal, via the control line, to the switch module when the field current is turned on and the output voltage is below a second threshold value. Preferably, the controller is further configured to maintain the output voltage at a regulation voltage by varying the field current through the field coil.

In another aspect, a method for controlling a generator operative to deliver electrical power to an electrical load is disclosed. The generator comprises a field coil and one or more stator windings coupled together via a switch module. The method comprises measuring field current through the field coil, via a first sense line, measuring an output voltage of the generator, via a second sense line, and applying a first control signal, via a control line, to the switch module when the field current is turned off and the output voltage is above a first threshold value or a second control signal, via the control line, to the switch module when the field current is turned on and the output voltage is below a second threshold value.

In another aspect, a method for controlling a generator operative to deliver electrical power to an electrical load is disclosed. The generator comprises a field coil and one or more stator windings coupled together via a switch module. The method comprises measuring field current through the field coil, via a first sense line, measuring an output voltage of the generator, via a second sense line, and applying a first control signal, via a control line, to the switch module when the field current is turned off and the output voltage is above a first threshold value or a second control signal, via the control line, to the switch module when the field current is turned on and the output voltage is below a second threshold value. Preferably, the generator comprises three stator windings, the switch module comprises three transistors each comprising one of a MOSFET, IGBT, and bipolar junction transistor, and the step of applying the first control signal comprises switching on the three transistors simultaneously.

In another aspect, a method for controlling a generator operative to deliver electrical power to an electrical load is disclosed. The generator comprises a field coil and one or more stator windings coupled together via a switch module. The method comprises measuring field current through the field coil, via a first sense line, measuring an output voltage of the generator, via a second sense line, and applying a first control signal, via a control line, to the switch module when the field current is turned off and the output voltage is above a first threshold value or a second control signal, via the control line, to the switch module when the field current is turned on and the output voltage is below a second threshold value. Preferably, the generator comprises three stator windings, the switch module comprises three transistors each comprising one of a MOSFET, IGBT, and bipolar junction transistor, and the step of applying the second control signal comprises switching on/off, at a predetermined frequency, the three transistors simultaneously.

In another aspect, a method for controlling a generator operative to deliver electrical power to an electrical load is disclosed. The generator comprises a field coil and one or more stator windings coupled together via a switch module. The method comprises measuring field current through the field coil, via a first sense line, measuring an output voltage of the generator, via a second sense line, and applying a first control signal, via a control line, to the switch module when the field current is turned off and the output voltage is above a first threshold value or a second control signal, via the control line, to the switch module when the field current is turned on and the output voltage is below a second threshold value. Preferably, the generator comprises three stator windings, the switch module comprises three transistors each comprising one of a MOSFET, IGBT, and bipolar junction transistor, and wherein the method further comprises measuring stator current through the three stator windings, via one or more stator winding sense lines and when the output voltage is within a predetermined voltage range of the regulation voltage, the step of applying the first or second control signal comprises applying a third control, via the control line, to the switch module to switch on/off the three transistors synchronously.

In another aspect, a method for controlling a generator operative to deliver electrical power to an electrical load is disclosed. The generator comprises a field coil and one or more stator windings coupled together via a switch module. The method comprises measuring field current through the field coil, via a first sense line, measuring an output voltage of the generator, via a second sense line, and applying a first control signal, via a control line, to the switch module when the field current is turned off and the output voltage is above a first threshold value or a second control signal, via the control line, to the switch module when the field current is turned on and the output voltage is below a second threshold value. Preferably, the method further comprises maintaining the output voltage at a regulation voltage by varying the field current through the field coil.

DETAILED DESCRIPTION OF THE PRESENTLY PREFERRED EMBODIMENTS

Figure 1:
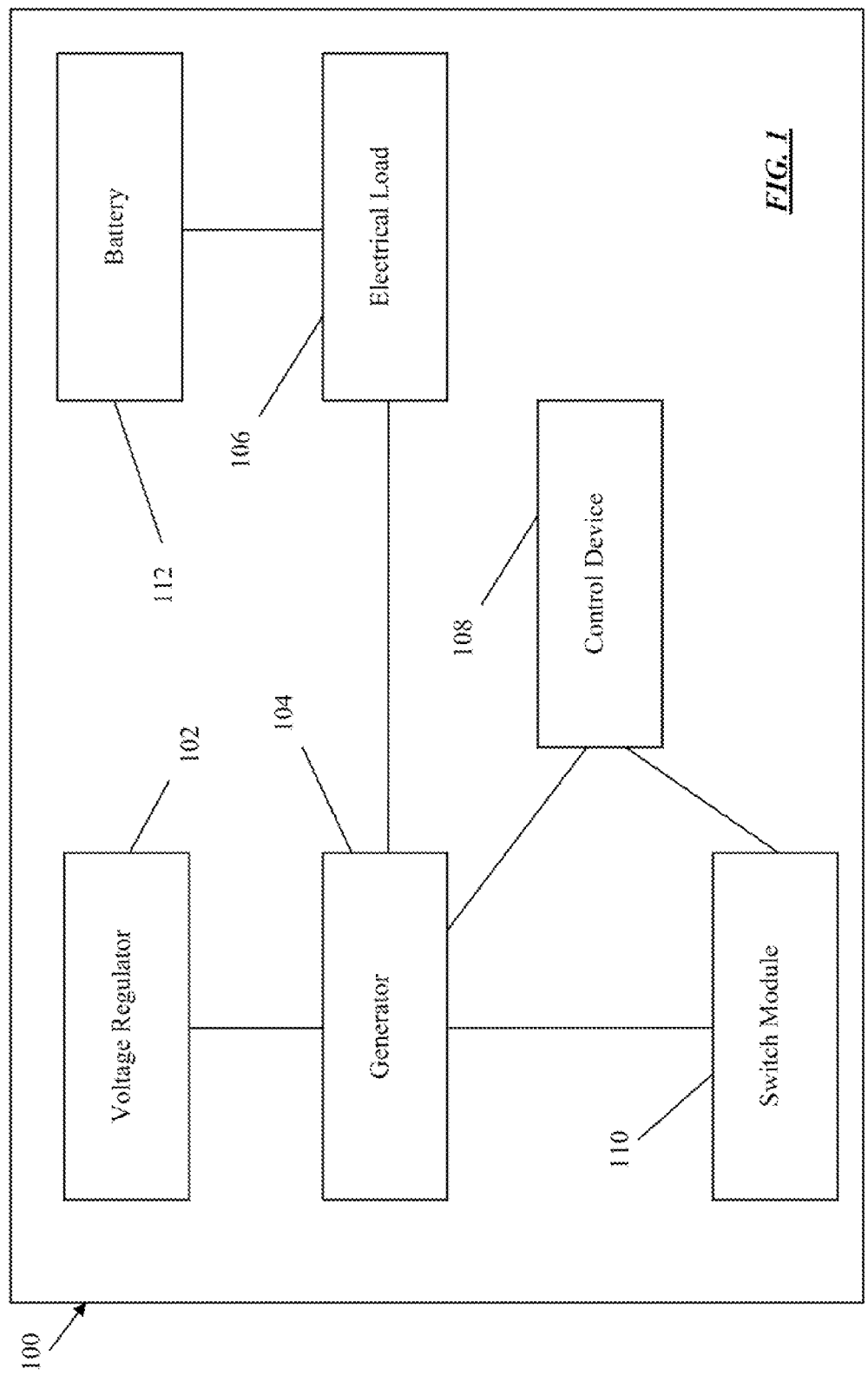
FIG. 1 shows a block diagram of a vehicle electrical system comprising a generator, a voltage regulator, electrical load, switch module, and control device according to a preferred embodiment.

FIG. 1 depicts a block diagram of a preferred embodiment of a vehicle electrical system 100, including a generator 104, a voltage regulator 102, electrical load 106, switch module 110, battery 112 and control device 108. The control device 108 is connected to and in communication with the generator 104 and switch module 110. The voltage regulator 102 operates to maintain the generator output voltage at a constant voltage as the speed of the generator 104 and electrical load 106 vary. In this preferred embodiment, the control device 108 and voltage regulator 102 are two separate components. In another preferred embodiment, discussed below, the control device 108 and voltage regulator 102 are a single unit. The electrical load 106 represents electrical loads by electrical components which may comprise a heating element, an air conditioning unit, a compressor, a cooling fan, headlights, a battery, or a pump, to name a few examples. As these electrical loads are applied and removed from the generator 104, the system voltage experiences dips and spikes that may last for hundreds of milliseconds. The intensity of these voltage transients increases as a function of the electrical load and speed of the generator 104. The generator 104 comprises a field coil (not shown) and one more stator windings (not shown) coupled together via the switch module 110. In this preferred embodiment, the switch module 110 replaces the conventional diode trio which is traditionally used as a means to self energize the regulator 102, known to artisans of ordinary skill. The control device 108 monitors the field current, stator current, and generator output voltage and controllably switches the switch module 110 to improve transient recovery due to sudden variations in the electrical load 106 and increase system efficiency during normal operation. In particular, the control device 108 measures the field current and output voltage of the generator 104 and applies a control signal to the switch module 110 in response to overvoltage and undervoltage conditions. The control device 108 maybe further configured to measure the stator current of the generator 104 and apply a control signal to the switch module 110 when the output voltage of the generator 104 is within a predetermined voltage range of the regulation voltage, i.e., normal operation, in order to increase the system efficiency.

In one embodiment, the generator 104 is a brushless alternator having a field coil (not shown) that generates a magnetic field when a field current passes through the field coil. The magnetic field interacts with one or more stator windings in the generator (not shown), inducing voltage across the stators which, in turn, produce the generator output current for consumption by the electrical load 106. The voltage regulator 102 is coupled with the generator field coil and operates to regulate the system voltage at a regulation voltage, for instance 28 V, by switching on/off the field coil, thereby, varying the average value of the field current.

The voltage regulator 102 comprises one or more switches (not shown) to accomplish this. In one instance, the voltage regulator 102 may utilize two switches. A first switch is disposed between one end of the field coil and a voltage source, such as the battery 112, and a second switch is disposed between the other end of the field coil and the battery 112. The voltage regulator 102 senses the output voltage of the generator 104 and applies a control signal to switch on/off the first switch to maintain the system voltage at the regulation voltage, and applies another control signal to switch off the second switch in response to a generator output voltage that is above a threshold value for a predetermined time interval. Following this over voltage condition and upon a system reset, the regulator switches on the second switch to continue normal operation. In this two-switch configuration, the voltage regulator 102 uses the first switch to regulate the system voltage at the regulation voltage, and the second switch to further prevent over voltage conditions that may occur when an electrical load is suddenly disconnected.

The control device 108 is coupled with the switch module 110, for instance a MOSFET, IGBT, or bipolar junction transistor. The control device 108 utilizes the switch module 110 in concert with the voltage regulator 102 in controlling the field current so as to maintain the output voltage of the generator 104 within a very narrow window even during sudden variations of the electrical load 106. Utilizing the switch module 110 in place of the conventional diode trio is advantageous during normal operating condition in that the control device 108 may be configured to switch the switch module 110 synchronously so as to reduce the voltage drop that would occur in the diode trio thereby increasing the overall system efficiency.

According to one preferred embodiment, the generator 104 comprises three stator windings and the switch module 110 comprises three transistors each comprising one of a MOSFET, IGBT, and bipolar junction transistor. The control device 108 is configured to measure the field current and an output voltage of the generator 104 and apply a control signal to the switch module 110 to directly suppress the voltage transients due to sudden connection/disconnection of the electrical load 106.

In particular, the control device 108 responses to overvoltage transients by measuring the field current and output voltage and applying a first control signal to the switch module 110 to switch on the three transistors simultaneously when the field current is turned fully off and the output voltage is above a first threshold value, for instance 30V. The control device 108 responses to undervoltage transients by applying a second control signal to the switch module 110 to switch on/off, at a predetermined frequency, the three transistors simultaneously. The predetermined frequency maybe considerably higher than the RPM of the generator 104. Undervoltage transients are recognized when the field current is turned fully on and the output voltage is below a second threshold value, for example 26V.

The control device 108 maybe further configured to measure the stator current through the three stator windings of the generator 104 and, when the output voltage is within a predetermined voltage range of the regulation voltage, i.e. 28±0.5V, apply a third control signal to the switch module 110 to switch on/off the three transistors synchronously. It is known to artisan of ordinary skill that the voltage drop across the above mentioned transistors are less than that across diodes used in the conventional diode trio architecture and as such, the control device 108 reduces power loss through the transistors increasing the overall system efficiency.

Figure 2:
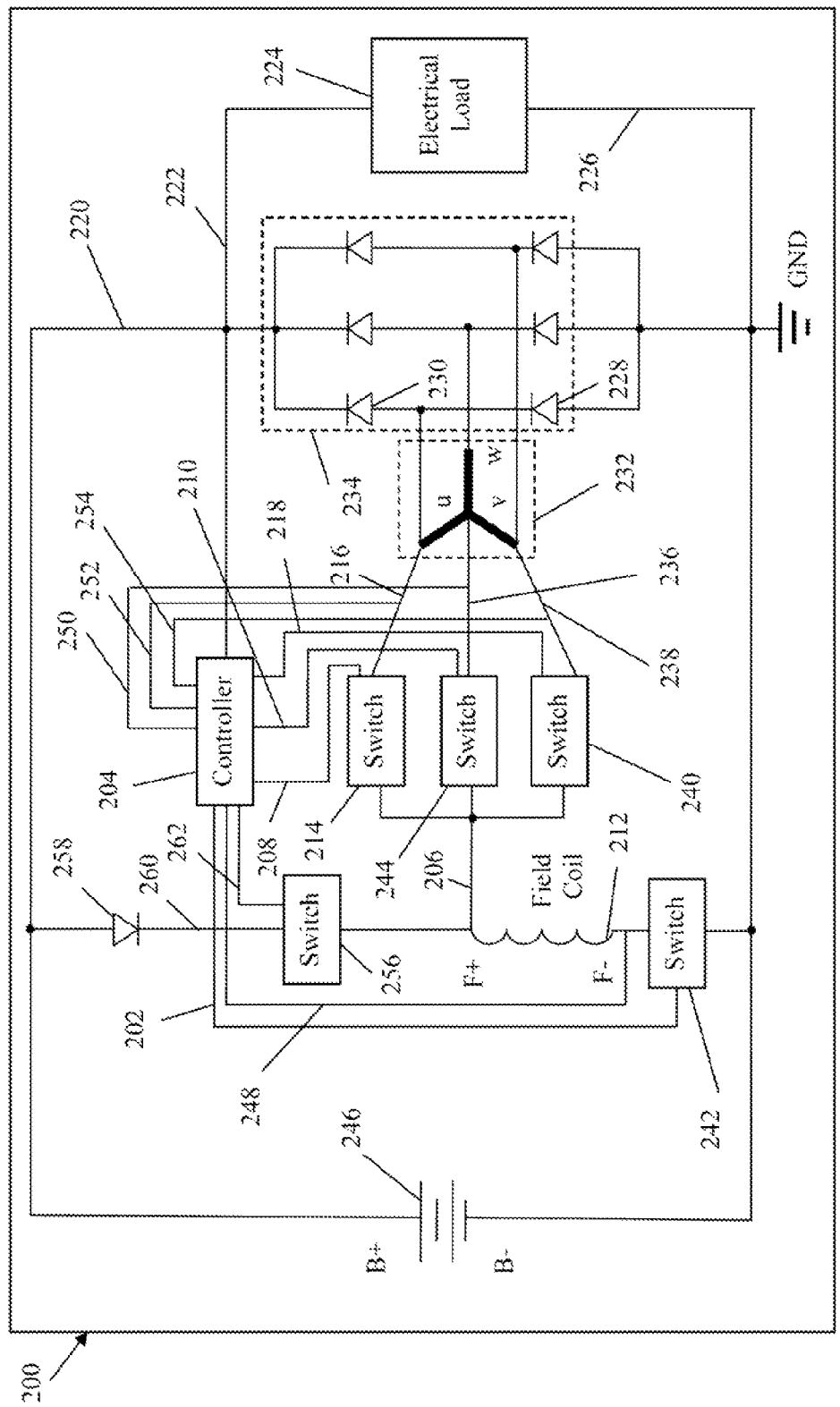
FIG. 2 shows a schematic diagram of the electrical connections between the various components within the vehicle electrical system of FIG. 1 according to a preferred embodiment.

FIG. 2 shows a schematic diagram 200 of the electrical connections between the various components within the vehicle electrical system of FIG. 1 according to a preferred embodiment. In this configuration, a generator, such as the generator 104, comprises a field coil 212, three-phase stator windings 232, and a full-wave rectifier circuit 234. The generator produces electrical current at its output 222, through an electrical load 224, to ground at 226. The electrical load 224 represents one or more electrical loads by electrical components such as those mentioned above. In this preferred embodiment, the control device and the voltage regulator, such as those depicted in FIG. 1 as components 108 and 102, are a single unit. As such the control device field control operates to regulate the output voltage and also respond to voltage transients.

The control device comprises a controller 204 and five low-power switches 214, 244, 240, 242 and 256 which maybe any of the MOSFET, IGBT, and bipolar junction transistor. In one preferred embodiment, the controller 204 is a 68HC08 processor having internal flash memory available from Freescale of Austin, Tex. It is contemplated that the processor may be a combination of individual discrete or separate integrated circuits packaged in a single housing or it may be fabricated in a single integrated circuit. The switch 242 is coupled between the field coil 212 and ground 226. The controller 204 measures the output voltage of the generator via a sense line 222 and maintains the output voltage of the generator at a regulation voltage, for instance, 28V by switching on/off the switch 242 via a control line 202. The controller 204 is further coupled and in communication with the three switches 214, 244, and 240 via control lines 208, 210, and 218, respectively. The controller 204 utilizes the switches 214, 244, and 240 to further respond to voltage transients due to sudden variations in the electrical load 224. In an alternative embodiment, the controller 204 measures the stator current of the three-phase stator windings 232 on lines 216, 236, and 238 via sense lines 252, 254, and 250, respectively and switches the switches 214, 244, and 240 synchronously during normal operating condition when the output voltage is within a predetermined voltage range of the regulation voltage, for instance, 28±0.5V. The controller 204 uses the switch 256 for over voltage protection, discussed in more detail below.

The generator, as represented by the field coil 212, three-phase stator windings 232, and the full-waive rectifier circuit 234, is coupled with the electrical load 224. The generator may be a brushless alternator. For a single stator brushless alternator, as in this embodiment, a rotor is used as a means to vary the magnetic field through the stator windings 232, thereby creating an alternating current that is rectified via the full-wave rectifier circuit 234 and fed to the electrical load 224. The output voltage of the alternator is controlled by the controller 204. The magnetic field created by the field coil 212 is a function of the field current through the field coil 212. As the electrical load 224 varies, the field current through the field coil 212 also varies. The higher the value of the electrical load 224, the higher the field current. As is known to artisans of ordinary skill, the field current through the field coil 212 does not follow the voltage across the field coil 212 instantaneously. Furthermore, there is a finite time associated with the dissipation of the field current through the field coil 212 which depends on the resistance R and inductance L of the field coil 212.

In a situation where the generator is operating at relatively high RPM and delivering high electrical current to the electrical load 224, there may occur a sudden reduction in the electrical load 224. Although, the controller 204, as discussed more fully below, responses to this event by virtually disconnecting the field coil 212 from the generator, vis-á-vis, switching off the switch 242, the decay of the field current through the field coil 212 may take hundreds of milliseconds which in most applications is unacceptably long. Similarly, in a situation where the electrical load 224 suddenly increases, the field coil 212 is switched on and remains on until the voltage reaches the regulation voltage. However, during this period, which may last for hundreds of milliseconds, the system voltage is below the regulation voltage. These two events, namely, over voltage and under voltage conditions are present, even in a vehicle electrical system that includes one or more batteries. In a batteryless environment, these voltage spikes and dips are of even greater intensity. These voltage transients are the most potentially destructive transients in the vehicle electrical system. Such over voltage and under voltage transients can be suppressed by storing electrical energy of the field coil in an electrical energy source, and by proving electrical energy from the electrical energy source to the field coil, as discussed in a co-pending commonly assigned U.S. patent application Ser. No. 12/286,649, entitled "Field Transient Suppression System and Method," incorporated herein in its entirety. The present invention seeks to further improve responses to such voltage transients.

The controller 204 operates the switch 242 to regulate the output voltage of the generator at a regulation voltage, for instance 28V. The switch 242 may operate by analog or digital logic, known to artisans of ordinary skill. Although, only one switch may be utilized for voltage regulation purposes, in this configuration, two switches, as mentioned above, is utilized. The switch 256 connects one side (F+) of the field coil 212 to generator output at 222 and the other switch 242 connects the other end (F−) of the field coil 212 to the ground 226. In this alternative embodiment, the switch 256 is utilized for over voltage protection and it is normally on. The controller 204 switches it off when a genuine over voltage condition occurs, such as if the switch 242 malfunctions in a short-circuit manner. The controller 204 utilizes the switch 242 to regulate the output voltage of the generator. The controller uses the switches 214, 244, and 240 in response to transient events, such as sudden connection/disconnection of the electrical load 224, so as to rapidly decrease the magnitude of the voltage transients without inadvertently switching on the over voltage protection switch 256.

During normal operation, the switch 242 is switched on/off which varies the field current in the field coil 212 in accordance with the electrical current demand by the electrical load 224. Different methods of voltage regulation may be implemented, such as those described in Jabaji, U.S. Pat. Nos. 7,352,157, 7,276,804, and 5,907,233 herein incorporated by reference in their entireties.

An over voltage condition is signified by an output voltage that is above a first threshold value and the field current is turned off, i.e., the switch 242 is switched off fully. The controller 204 then applies a first control signal to the switches 214, 244, and 240 to switch them on simultaneously via lines 208, 210, and 218, respectively, effectively and temporarily connecting the stator windings 232.

An under voltage condition is signified by an output voltage that is below a second threshold value and the field current is turned on, i.e., the switch 242 is switched on fully. The controller 204 then applies a second control signal to the switches 214, 244, and 240 to switch them on/off simultaneously, at a predetermined frequency, for instance, 50 times the generator RPM, via lines 208, 210, and 218, respectively, effectively and temporarily connecting/disconnecting the stator windings 232.

Normal operating condition is signified by an output voltage that is within a predetermined voltage range of the regulation voltage. The controller 204 applies a third control signal to the switches 214, 244, and 240 to switch them on/off synchronously, via lines 208, 210, and 218, respectively. A typical phase-locked loop method, known to artisans of ordinary skill, maybe implemented in the controller 204 to synchronously switch the switches 214, 244, and 240. Since the power loss through the switches 214, 244, and 240 is less than that through typical diodes used in diode trios, the efficiency of the electrical system is increased.

Utilizing the vehicle electrical system of FIG. 2, one embodiment of the operation of the control device is now described. Following power up, the controller 204 switches on/off the switch 242 according to the current demand by the electrical load 224. A sudden application of the electrical load 224 may cause the controller 204 to switch on the switch 242 fully but if the electrical load 224 is too large, the generator output voltage may decrease below a first threshold value, indicative of a transient under voltage condition. The controller 204 switches on/off, at a predetermined frequency, the switches 214, 244, and 240 simultaneously which rapidly raises the generator output voltage. A sudden disconnection of the electrical load 224 may cause the controller 204 to switch off the switch 242 fully but if the electrical load 224 is too large, the generator output voltage may increase above a second threshold value, indicative of a transient over voltage condition. The controller 204 switches on the switches 214, 244, and 240 simultaneously which rapidly lowers the generator output voltage. During normal operating condition, the controller 204 switches on/off the switches 214, 244, and 240 synchronously with low power loss through the switches which maybe any MOSFET, IGBT, and bipolar junction transistor.

Figure 3:
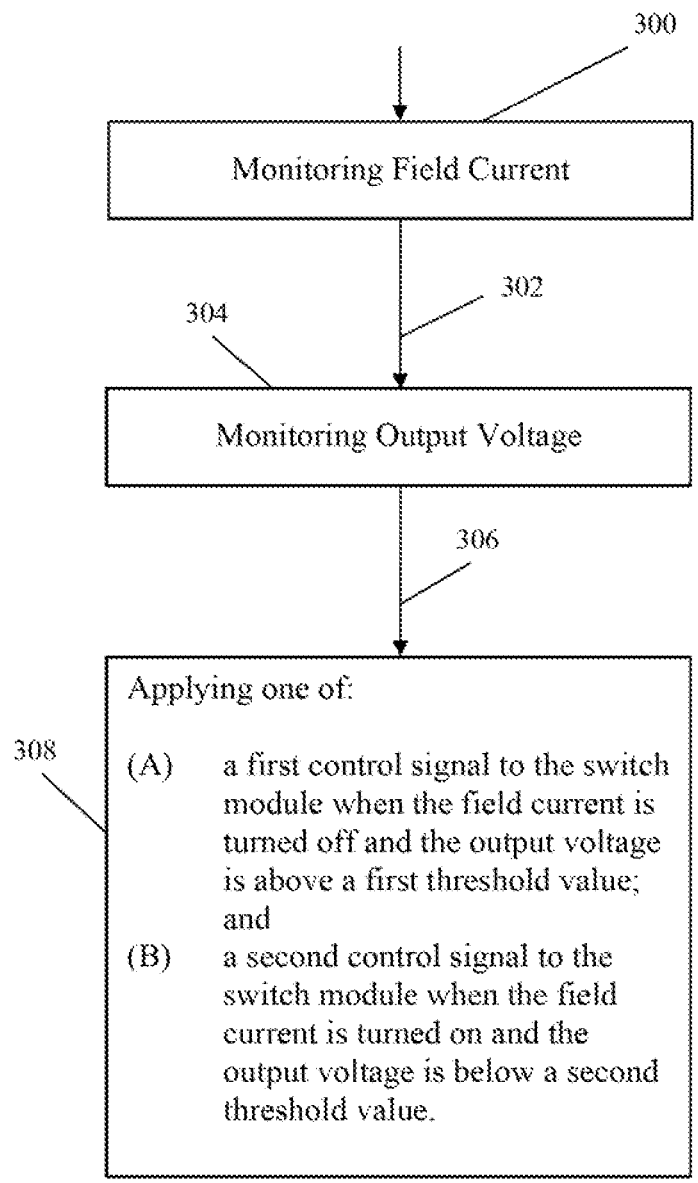
FIG. 3 is a flow diagram of one preferred method of operation of the control device of FIGS. 1 and 2.

FIG. 3 is a flow diagram of one preferred method of operation of the control device of FIGS. 1 and 2. According to this embodiment, the method comprises monitoring the field current of the field coil 212 at 300 and output voltage of generator 104 at 304 and applying an appropriate control signal to the switches 214, 244, and 240 at 308 to suppress voltage transients. In particular, the controller 204 measures the field current and output voltage and responses to over voltage and undervoltage conditions by applying either a first control signal to the switches 214, 244, and 240 when the field current is turned off and the output voltage is above a first threshold value, or a second control signal to the switches 214, 244, and 240 when the field current is turned on and the output voltage is below a second threshold value.

Figure 4:
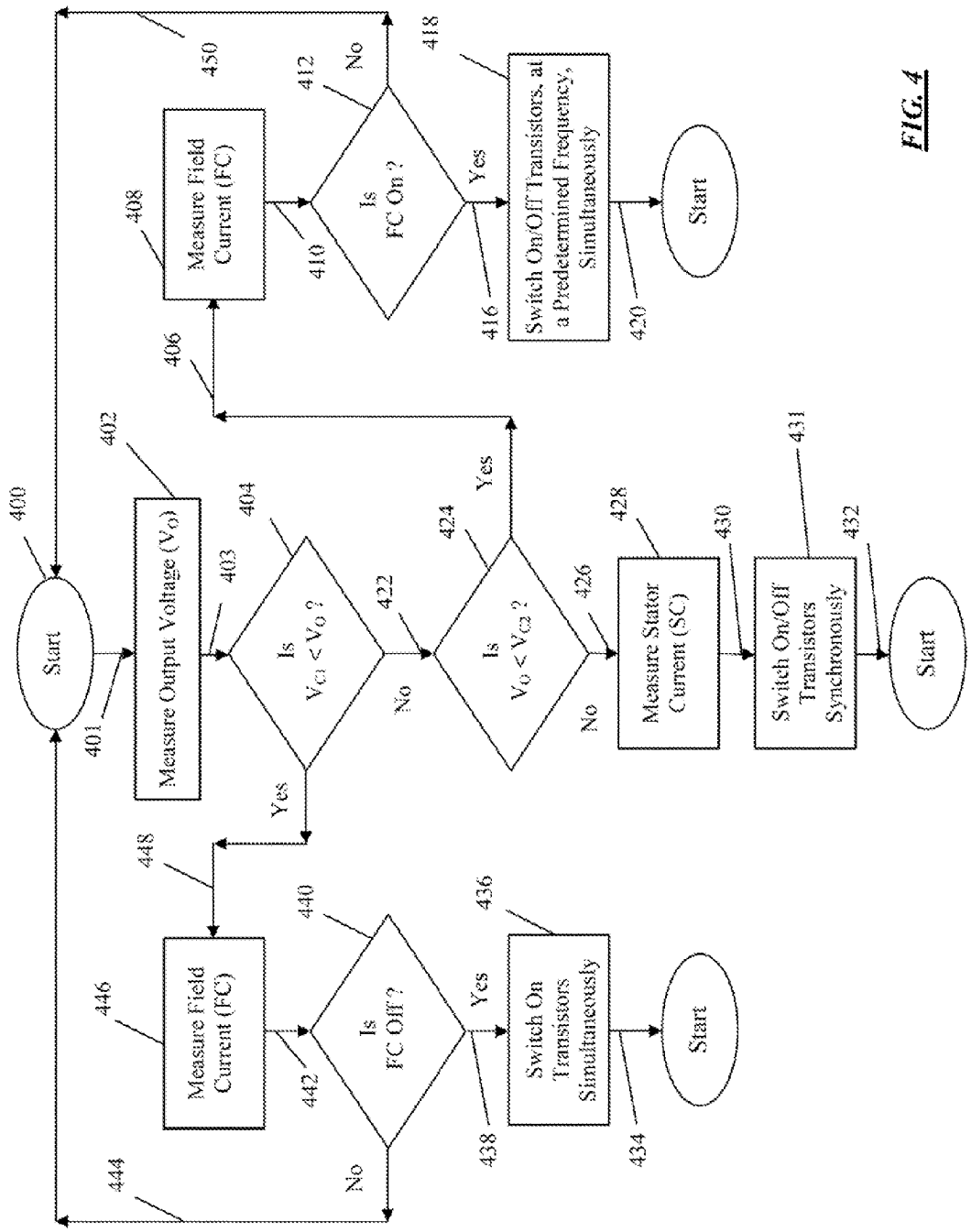
FIG. 4 is a flow diagram of one preferred method of operation of the control device of FIGS. 1 and 2 that maybe implemented on a processor, included in the control device, further detailing the conditions under which the control device switches the switch module to improve transient recovery and improve system efficiency.

FIG. 4 is a flow diagram of one preferred method of operation of the control device of FIGS. 1 and 2 further illustrating how the control device 108 may operate to respond to transients events as well as synchronously switching the switches 214, 244, and 240 to improve system efficiency during normal operating condition. Upon power up at 400, the controller 204 measures the output voltage $V_O$ of the generator 104 at 402. The voltage $V_O$ is compared with a first predetermined voltage $V_{C1}$ at 404. If the voltage $V_O$ is less than or equal to $V_{C1}$ the controller 204 is branched at 422 and $V_O$ is compared with a second predetermined voltage $V_{C2}$ at 424. If the voltage $V_O$ is greater than or equal to $V_{C2}$ the controller 204 branches at 426 and measures the stator current at 428 and synchronously switches on/off the switches 214, 244, and 240 at 431 and branches at 432 to the start 400 to repeat the loop.

If the voltage $V_O$ is greater than $V_{C1}$ the controller 204 is branched at 448 to measure the field current at 446. The controller 204 determines if the field current is off fully at 440. If the field current is not fully off, the controller 204 is branched at 444 to start 400 to repeat the loop. If the field current is fully off, the controller 204 is branched at 438 and switches on the switches 214, 244, and 240 simultaneously at 436, branching at 434 to start 400 to repeat the loop.

If the voltage $V_O$ is less than $V_{C2}$ the controller 204 is branched at 406 to measure the field current at 408. The controller 204 determines if the field current is off on at 412. If the field current is not fully on, the controller 204 is branched at 450 to start 400 to repeat the loop. If the field current is fully on, the controller 204 is branched at 416 and switches on/off the switches 214, 244, and 240 simultaneously, at a predetermined frequency, at 418, branching at 420 to start 400 to repeat the loop.

The foregoing discloses a control device included in a vehicle electrical system comprising a generator, voltage regulator, and a switch module. The generator includes a field coil and one or more stator windings coupled together via the switch module and operates to deliver electrical power to an electrical load. The voltage regulator maintains the generator output voltage at a constant voltage by varying the field current. The switch module may include low-power transistors. The control device monitors the field current, output voltage and stator current and applies control signals to the switch module to improve transient recovery due to sudden variations in the electrical load and increase system efficiency during normal operation.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A vehicle electrical system comprising:
   (a) a generator operative to deliver electrical power to an electrical load, said generator comprising:
   (i) a field coil; and
   (j) one or more stator windings coupled with the field coil via a switch module;
   (b) a voltage regulator operative to maintain an output voltage of the generator at a regulation voltage by varying field current through the field coil; and
   (c) a control device configured to monitor the field current and output voltage and apply one of:
   (i) a first control signal to the switch module when the field current is turned off and the output voltage is above a first threshold value; and
   (j) a second control signal to the switch module when the field current is turned on and the output voltage is below a second threshold value.

2. The system of claim 1, wherein the generator comprises three stator windings, the switch module comprises three transistors each comprising one of a MOSFET, IGBT, and bipolar junction transistor, and wherein the first control signal switches on the three transistors simultaneously.

3. The system of claim 1, wherein the generator comprises three stator windings, the switch module comprises three transistors each comprising one of a MOSFET, IGBT, and bipolar junction transistor, and wherein the second control signal switches on/off, at a predetermined frequency, the three transistors simultaneously.

4. The system of claim 1, wherein the generator comprises three stator windings, the switch module comprises three transistors each comprising one of a MOSFET, IGBT, and bipolar junction transistor, and wherein the control device is further configured to monitor stator current through the three stator windings and, when the output voltage is within a predetermined voltage range of the regulation voltage, apply a third control signal to the switch module to switch on/off the three transistors synchronously.

5. A method for controlling a vehicle electrical system, said system comprising:
   (a) a generator operative to deliver electrical power to an electrical load, said generator comprising:
   (i) a field coil; and
   (j) one or more stator windings coupled with the field coil via a switch module;
   (b) a voltage regulator operative to maintain an output voltage of the generator at a regulation voltage by varying field current through the field coil;
   said method comprising:
   (1) monitoring the field current;
   (2) monitoring the output voltage; and
   (3) applying one of:
   (A) a first control signal to the switch module when the field current is turned off and the output voltage is above a first threshold value; and
   (B) a second control signal to the switch module when the field current is turned on and the output voltage is below a second threshold value.

6. The method of claim 5, wherein the generator comprises three stator windings, the switch module comprises three transistors each comprising one of a MOSFET, IGBT, and bipolar junction transistor, and wherein the step of (3)(A) comprises switching on the three transistors simultaneously.

7. The method of claim 5, wherein the generator comprises three stator windings, the switch module comprises three transistors each comprising one of a MOSFET, IGBT, and bipolar junction transistor, and wherein the step of (3)(B) comprises switching on/off, at a predetermined frequency, the three transistors simultaneously.

8. The method of claim 5, wherein the generator comprises three stator windings, the switch module comprises three transistors each comprising one of a MOSFET, IGBT, and bipolar junction transistor, and wherein the method further comprises:
   (4) monitoring stator current through the three stator windings; and
   when the output voltage is within a predetermined voltage range of the regulation voltage, the step of (3) comprises applying a third control signal to the switch module to switch on/off the three transistors synchronously.

9. A control device coupled with a generator operative to deliver electrical power to an electrical load, said generator comprising a field coil and one or more stator windings, said control device comprising:
   (a) a switch module wherein said one or more stator windings are coupled with the field coil via the switch module; and
   (b) a controller, coupled with the generator and switch module;
   wherein the controller is configured to:
   measure field current through the field coil, via a first sense line;
   (j) measure an output voltage of the generator, via a second sense line; and
   (k) apply one of:

(1) a first control signal, via a control line, to the switch module when the field current is turned off and the output voltage is above a first threshold value; and (2) a second control signal, via the control line, to the switch module when the field current is turned on and the output voltage is below a second threshold value.

10. The control device of claim 9, wherein the generator comprises three stator windings, the switch module comprises three transistors each comprising one of a MOSFET, IGBT, and bipolar junction transistor, and wherein the first control signal switches on the three transistors simultaneously.

11. The control device of claim 9, wherein the generator comprises three stator windings, the switch module comprises three transistors each comprising one of a MOSFET, IGBT, and bipolar junction transistor, and wherein the second control signal switches on/off, at a predetermined frequency, the three transistors simultaneously.

12. The control device of claim 9, wherein the generator comprises three stator windings, the switch module comprises three transistors each comprising one of a MOSFET, IGBT, and bipolar junction transistor, and wherein the control device is further configured to measure stator current through the three stator windings, via one or more stator winding sense lines, and, when the output voltage is within a predetermined voltage range of a regulation voltage, apply a third control signal, via the control line, to the switch module to switch on/off the three transistors synchronously.

13. The control device of claim 9, wherein the controller is further configured to maintain the output voltage at a regulation voltage by varying the field current through the field coil.

14. A method for controlling a generator operative to deliver electrical power to an electrical load, said generator comprising a field coil and one or more stator windings, said one or more stator windings coupled with the field coil via a switch module, said method comprising:

(i) measuring field current through the field coil, via a first sense line;

(j) measuring an output voltage of the generator, via a second sense line; and (k) applying one of:

(1) a first control signal, via a control line, to the switch module when the field current is turned off and the output voltage is above a first threshold value; and (2) a second control signal, via the control line, to the switch module when the field current is turned on and the output voltage is below a second threshold value.

15. The method of claim 14, wherein the generator comprises three stator windings, the switch module comprises three transistors each comprising one of a MOSFET, IGBT, and bipolar junction transistor, and wherein the step of (k)(1) comprises switching on the three transistors simultaneously.

16. The method of claim 14, wherein the generator comprises three stator windings, the switch module comprises three transistors each comprising one of a MOSFET, IGBT, and bipolar junction transistor, and wherein the step of (k)(2) comprises switching on/off, at a predetermined frequency, the three transistors simultaneously.

17. The method of claim 14, wherein the generator comprises three stator windings, the switch module comprises three transistors each comprising one of a MOSFET, IGBT, and bipolar junction transistor, and wherein the method further comprises:

(l) measuring stator current through the three stator windings, via one or more stator winding sense lines; and when the output voltage is within a predetermined voltage range of the regulation voltage, the step of (k) comprises applying a third control signal, via the control line, to the switch module to switch on/off the three transistors synchronously.

18. The method of claim 14, further comprising (l) maintaining the output voltage at a regulation voltage by varying the field current through the field coil.

* * * * *